(12) United States Patent
Sheridan et al.

(10) Patent No.: US 10,731,308 B2
(45) Date of Patent: Aug. 4, 2020

(54) FLOOD CONTROL SYSTEM

(71) Applicants: Joseph Sheridan, Rumson, NJ (US); Daniel Swift Gagliano, Point Pleasant, NJ (US)

(72) Inventors: Joseph Sheridan, Rumson, NJ (US); Daniel Swift Gagliano, Point Pleasant, NJ (US)

(*) Notice: Subject to any disclaimer, the term of this patent is extended or adjusted under 35 U.S.C. 154(b) by 0 days.

(21) Appl. No.: 16/137,521

(22) Filed: Sep. 20, 2018

(65) Prior Publication Data
US 2020/0095742 A1    Mar. 26, 2020

(51) Int. Cl.
*E02B 3/10* (2006.01)
*E04H 9/14* (2006.01)
*E06B 9/00* (2006.01)

(52) U.S. Cl.
CPC ............ *E02B 3/108* (2013.01); *E04H 9/145* (2013.01); *E06B 2009/007* (2013.01)

(58) Field of Classification Search
CPC .... E02B 3/108; E04H 9/145; E06B 2009/007
USPC ................................. 405/107, 115, 116
See application file for complete search history.

(56) References Cited

U.S. PATENT DOCUMENTS

| 5,988,946 A * | 11/1999 | Reed ............... | E02B 3/102 405/114 |
| 9,637,881 B2 * | 5/2017 | McNally ............ | E02B 3/106 |
| 2003/0143027 A1 * | 7/2003 | Obermeyer ......... | E02B 3/102 405/115 |

* cited by examiner

*Primary Examiner* — Tara Mayo-Pinnock
(74) *Attorney, Agent, or Firm* — Bakos & Kritzer (57) ABSTRACT

A flood control system is provided that allows an unobstructed view of the surrounding area when not in use. The flood control system comprises a base and at least one foundation coupled to the base. The base is positioned below a grade to protect an area from the encroachment of fluid or semi-solids. An expandable barrier is removably coupled to a channel in the base. The expandable barrier is inflated with a source of pressurized fluid to form a barrier to prevent the encroachment of fluid or semi-solids to the protected area.

19 Claims, 6 Drawing Sheets

FLOOD CONTROL SYSTEM

TECHNICAL FIELD

The system and methods disclosed herein relate to a flood control system comprising one or more flood barriers designed to be generally hidden when not activated so as to not interfere with the physical and aesthetic features of a structure yet capable of being deployed quickly and efficiently when use is desired and necessary.

BACKGROUND

In simple terms, a flood is generally defined as an overflow of water that submerges land that is not normally covered by water. Flooding may occur as an overflow of water from a body of water, such as a river, lake, or ocean, in which the water overtops or breaks levees, resulting in some of that water escaping its usual boundaries. Such overflow of water is generally the result of a weather-related event that brings excessive water to a specific area. Floods are generally classified into five principal categories:
 (1) Areal flooding is characterized as excessive accumulation of water in low-lying areas or local depressions that occurs as a result of a rapid influx of water to the region, commonly as a result of snowmelt or rainfall. The excessive water is supplied at a rate that is greater than the rate the water is able to infiltrate the surface or run away from the surface;
 (2) Channel flooding is characterized by rivers exceeding capacity, and is commonly referred to as overbank flooding;
 (3) Flooding in estuarine and coastal areas is generally the result of tidal changes based on wind and declines in barometric pressure. It is common to associate such flooding with tsunami or cyclone conditions;
 (4) Flooding in city environments are often weather related and caused by rainfall exceeding catch basins and drainage systems commonly employed to control flooding of urban environments; and
 (5) Catastrophic flooding is generally characterized by infrastructure failure such as a dam collapse or alteration to drainage control systems, which can also be the result of volcanic activity, earthquake, or the like. Catastrophic flooding creates substantial monetary and human losses.

Flooding associated with the aforementioned categories can cause devastating results. At its greatest level, flooding can lead to loss of life. In addition, flooding can create substantial economic damage such as damage to infrastructure such as buildings, roadways, drainage systems, power systems and grids, water treatment facilities and systems, and the like. Flooding can also cause ripple-effect economic damage such as declines in tourism and commodity price increases. Thus, in order to prevent the inherent damage caused by flooding, there is a need in the art for a flood control system that can quickly be deployed to prevent the encroachment of fluid and semi-solid to a protected area. There is a further need in the art for a flood control system that provides an unobstructed view of the surrounding area when not in use.

While systems exist in the art designed to protect infrastructure, such known systems are simplistic and ineffective especially in the case of catastrophic flooding or other unpredictable and immediate flooding. In short, the most prevalent flood control systems employed throughout the world are "interlocking" protective barriers commonly employing sand or other fluid-like substance. For example, it is commonplace to employ multiple detachably interconnected flexible bladder units (e.g., sandbags) positioned end-to-end along an edge of the flood waters. Typically, each of the bladder units includes a sleeve interconnected with an adjacent bladder unit to form a continuous barrier to prevent undesirable encroaching of the flood waters. Sandbag bladder units are generally inexpensive and available at a low cost. Further, sandbag bladder units are flexible and account for changes in ground surface along a barrier.

However, such systems are inherently flawed as they require substantial effort, manpower, and time in order to create a continuous barrier to prevent the encroachment of flood waters. In addition, to be an effective form of flood defense they must be arranged properly, as an improperly arranged sandbag barrier will only offer minimal protection from the encroachment of flood waters and will not ultimately prevent flood waters from entering a property. The desired length and height of a barrier can prevent an effective application of this type of system to prevent a catastrophic flood. Finally, once the barrier is constructed, it requires sufficient resources to remove and dispose of the barrier which is often excessively damaged by the flood water and ultraviolent light as the barrier remains in the sun for an extended duration. Improper disposal can lead to contamination.

Such inherent disadvantages in known systems have not been entirely ignored in the industry. Certain semi-permanent barriers are also well known in the art such as mobile dams. However, such devices are incapable of being employed in wide-scale use due to excessive cost, quickness and efficiency in their employment, and lack of automation, among other drawbacks. The principles disclosed herein are designed to overcome the drawbacks of known temporary and semi-permanent barrier systems employed in the art.

Yet another known system is to install an inflatable bladder in a subterranean trough that is covered with a plate when not in use. The inflatable bladder is secured to the trough by affixing several sufficiently heavy anchors along the length of the barrier to resist the force of the flood waters pulling the inflatable bladder from the trough. The heavy anchors introduce additional costs and additional points of failure due to improperly attached anchors which can lead to a complete failure of the barrier. Further, the problem persists that sufficient resources are required to remove and dispose of the barrier, which is often damaged by the flood, due to the heavy anchors attached to the inflatable bladder at various points through the trough. Therefore, there is a need in the art for an inflatable bladder that is secured utilizing an interference fit, thereby removing the need for costly anchor points that can introduce additional failure points.

BRIEF SUMMARY

It has been well-documented that many scientists, authors, activists, etc. contend that climate change culminates in creating natural processes that are likely to cause (or already have caused) an increase in factors that lead to flooding. While many projects and proposals exist to potentially combat climate change, it is clear that flood control systems must be considered to mitigate the damage of floods. Therefore, a flood control system is provided that allows for an unobstructed view of the surrounding area when the flood control system is not in use. The flood control system comprises a base and at least one foundation coupled to the base. The base is positioned below a grade to protect an area from the encroachment of fluid or semi-solids. The dimension and location of the base can be determined by the flood history of the protected area. Proper dimensions and location of the barrier system in accordance with the principles disclosed herein can be determined by one of ordinary skill in the art, taking into account certain site-specific characteristics and engineering such as (1) observation of previous and present flood heights and inundated areas, (2) statistical, hydrologic, and hydraulic model analyses, (3) mapping inundated areas and flood heights for future flood scenarios, (4) long-term land use planning and regulation, (5) engineering design and construction of structures to control or withstand flooding, (6) intermediate-term monitoring, forecasting, and emergency-response planning, and (7) short-term monitoring, warning, and response operations. An expandable barrier is removably coupled to a channel in the base. When the flood control system is not in use, the expandable barrier is deflated to provide an unobstructed view of the surrounding area for a structure located within the protected area. In one embodiment, the base and the opening of the channel can be covered by a plate, landscaping, or other aesthetic measures, thereby concealing the flood control system. The expandable barrier can be placed in the channel and is inflated with a source of pressurized fluid to form a barrier to prevent the encroachment of fluid or semi-solids to the protected area.

BRIEF DESCRIPTION OF THE DRAWINGS

The detailed description makes reference to the accompanying figures wherein.

The figures are only intended to facilitate the description of the principles disclosed herein. The figures do not illustrate every aspect of the principles disclosed herein and do not limit the scope of the principles disclosed herein. Other objects, features, and characteristics will become more apparent upon consideration of the following detailed description.

DETAILED DESCRIPTION

A detailed illustration is disclosed herein. However, techniques, methods, processes, systems and operating structures in accordance with the principles disclosed herein may be embodied in a wide variety of forms and modes, some of which may be quite different from those disclosed herein. Consequently, the specific structural and functional details disclosed herein are merely representative.

Figure 1:
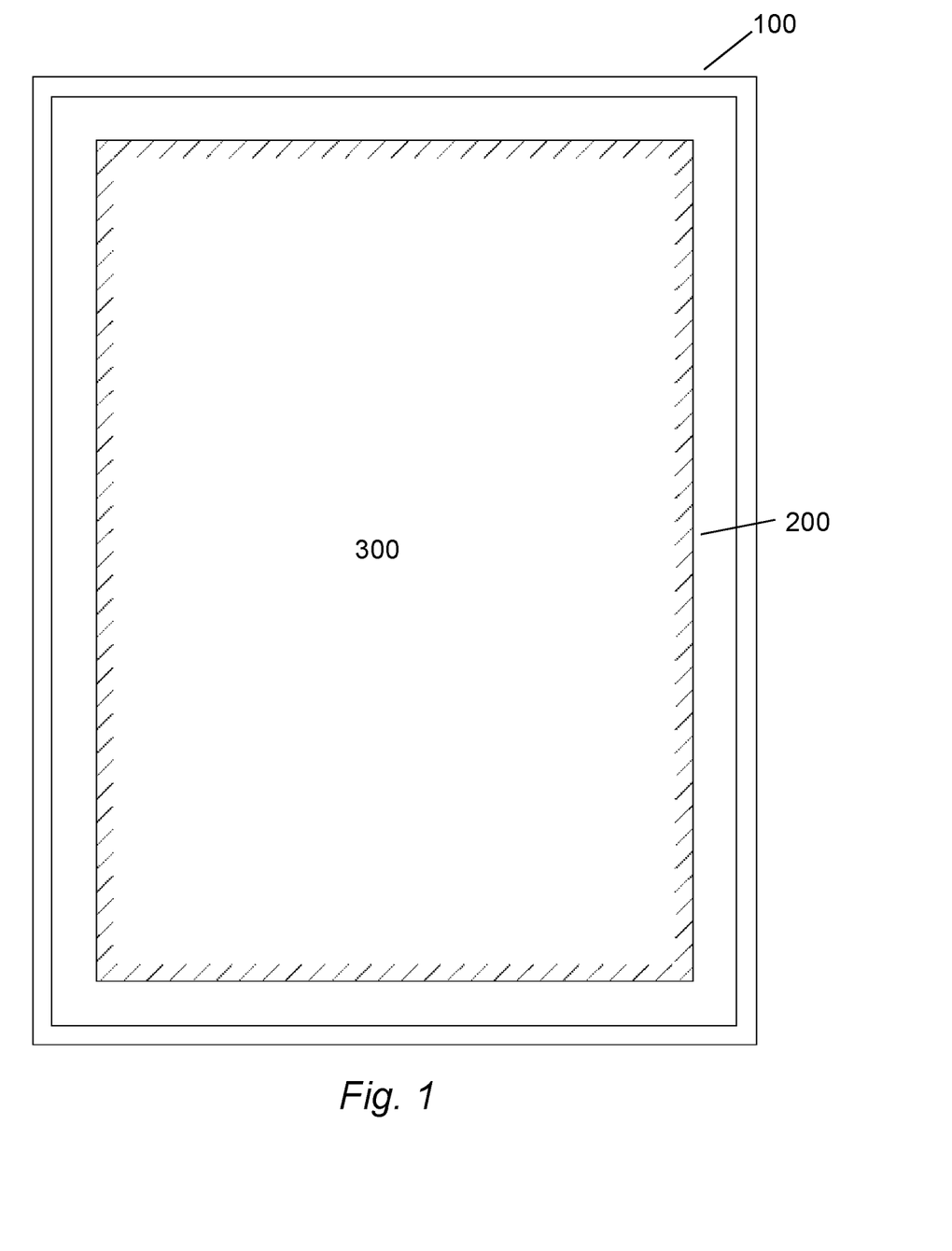
FIG. 1 illustrates a top view of a flood control system in accordance with the principles disclosed herein.

Referring initially to FIG. 1, shown is a top view of flood control system 100 in accordance with the principles disclosed herein. As shown, structure 300 is positioned within protected area 200. The length and shape of flood control system 100 is customizable and can be varied depending on the protected area 200 that flood control system 100 is intended to protect from the encroachment of fluid or semi-solids (such as rocks, snow, mud, sediment, or the like). Flood control system 100 can be constructed such that it completely encloses structure 300 as shown in FIG. 1, or it may be built to run along a length of one or more sides of structure 300. It is contemplated that the flood control system can fully, substantially, or partially protect the desired structure depending on the anticipated and desired flood control based on the aforementioned predicting factors and cost concerns. For example, if a river along the east of the structure is the only source of flood concern, then in one embodiment, the flood control system can be positioned to the east of the structure and west of the river, such that the flood control system runs solely aside the east of the structure. Therefore, the flood control system can protect the structure from potential flooding by the river. It would be apparent to one or ordinary skill in the art to adjust the protected area without departing from the principles disclosed herein. It would also be apparent to one of ordinary skill in the art for the flood control system to partially surround the structure without departing from the principles disclosed herein.

Figure 2:
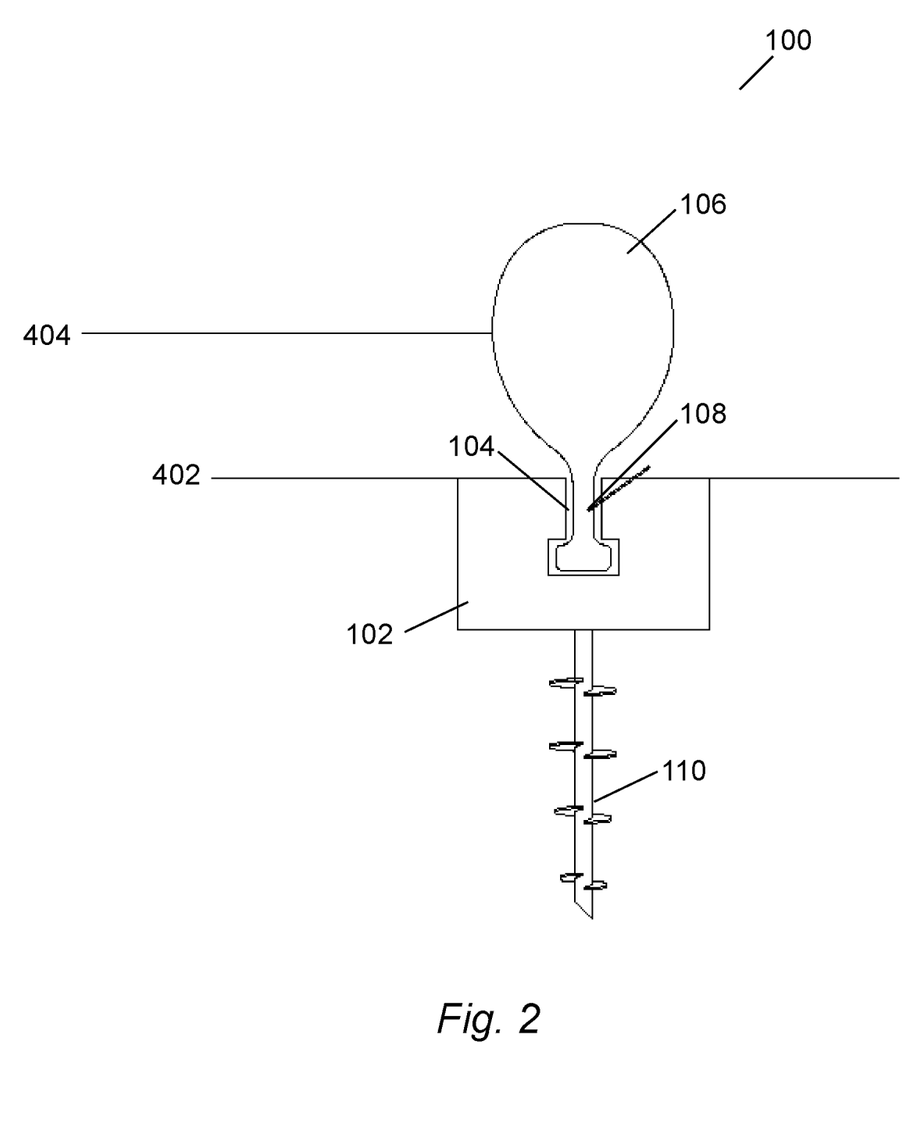
FIG. 2 illustrates a cross-sectional side view of the flood control system shown in FIG. 1 in accordance with the principles disclosed herein.

FIG. 2, depicts a cross-sectional side view of flood control system 100. Flood control system 100 comprises base 102 and foundation 110. In the preferred embodiment, base 102 is positioned below grade 402 and surrounds structure 300 as shown in FIG. 1. The thickness (vertically and horizontally) of base 102 is determined by the expected magnitude of the encroachment of fluid or semi-solids from the flood history of the protected area. Similarly, the thickness (vertically and horizontally) of foundation 110 is directly proportional to the expected magnitude of the encroachment of fluid or semi-solids.

Base 102 is constructed from solid building material such as concrete, steel, combination of concrete or steel, or other suitable material known in the art for forming a generally rigid building material and includes channel 104. As shown in FIG. 2, channel 104 is an upside down T-channel shape configured to secure an inflated barrier 106 into base 102. Further, channel 104 is continuous and runs along the entire length of base 102. It would be apparent to one of ordinary skill in the art, to create a channel with various shapes that provide sufficient restriction to secure an inflated barrier, without departing from the spirit of the broad inventive concepts disclosed herein.

A plurality of foundation 110 are coupled to base 102. Foundation 110 extends downward into the ground to provide support for base 102 against the force of the encroachment of fluid or semi-solids. In the preferred embodiment, foundation 110 is a metal helical pile. The size of the metal helical pile is determined by the expected magnitude of the encroachment of fluid or semi-solids from the flood history of the protected area. In addition, the distance between the plurality of foundation 110 is determined by the expected magnitude of the encroachment of fluid or semi-solids from the flood history of the protected area. The smaller the distance between the plurality of foundation, the greater the foundational support. Therefore, the distance between the plurality of foundation 110 is inversely proportional to the expected magnitude of the encroachment of fluid or semi-solids.

Flood control system 100 further comprises barrier 106. As shown in FIG. 2, barrier 106 is constructed from a durable, inflatable, and expandable material. For example, barrier 106 can be constructed from ship recovery balloon, bladder, or tube fabric (e.g., PVC coated fabric, synthetic tire-cord layers, etc.). In addition, it is contemplated that the barrier can be constructed from synthetic or non-synthetic (e.g., rubber) or composite materials reinforced with metallic or non-metallic fibers which may be axially aligned or constructed in a linear configuration. Fibers can also be constructed of para-aramids or meta-aramids known in the art, and depending on the embodiment the materials employed can be jacketed, coated, or encased in polyurethane, elastomeric materials, or other similar materials to improve the resiliency of the fibers. Barrier 106 further includes port 108. Port 108 is configured to provide access to inflate and deflate barrier 106. Barrier 106 is preferably inflated by attaching a source of pressurized fluid to port 108. For example, barrier 106 is inflated with an air compressor utilizing a generator or other power source depending on the anticipated magnitude of the flood. The generator can utilize electricity or gas power for remote areas where electricity has been disrupted and off-grid properties with little or no access to 110/220 Volt AC electricity. In its inflated state, barrier 106 is secured within channel 104. The length and size of barrier 106 is configured to fit within channel 104, thereby preventing the encroachment of fluid or semi-solids to the protected area through channel 104. In addition, the length and size of barrier 106 can be configured in a compact form to limit the size of channel 104. Further, the height of barrier 106 is configured to prevent the encroachment of fluid or semi-solids that have risen to elevation 404.

Figure 3:
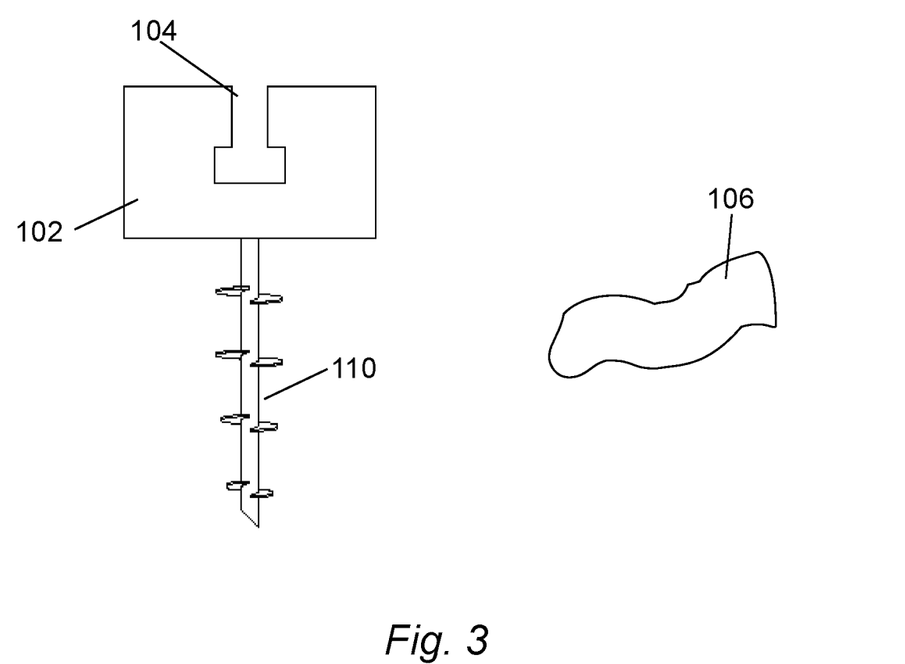
FIG. 3 illustrates a cross-sectional side view of the flood control system shown in FIG. 1 with a barrier positioned outside of a channel in accordance with the principles disclosed herein.
Figure 4:
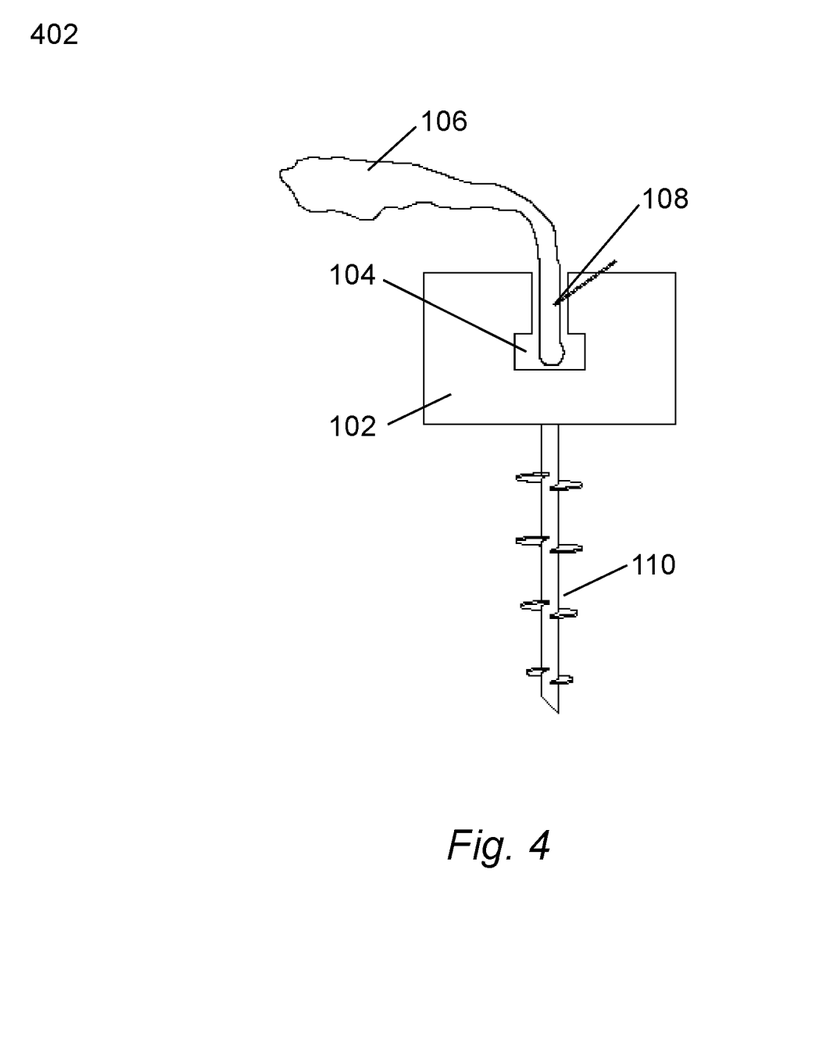
FIG. 4 illustrates a side view of the flood control system shown in FIG. 3 with the barrier positioned in the channel in accordance with the principles disclosed herein.

FIG. 3 and FIG. 4 show the process of assembling flood control system 100 to prevent the encroachment of fluid or semi-solids. As shown in FIG. 3, when flood control system 100 is not in use, barrier 106 is positioned outside of channel 104. As a result, structure 300 has an unobstructed view of the surrounding environment. In one embodiment, the base and the opening of the channel can be covered by a plate, landscaping, or other aesthetic measures, thereby concealing the flood control system. In FIG. 4, barrier 106 of flood control system 100 has been placed into channel 104 of base 102 in a deflated state. In its deflated state, barrier 106 can be permanently inserted or temporarily and quickly inserted and removed from channel 104 of base 102. After placing barrier 106 into channel 104, the process of preparing flood control system 100 to prevent the encroachment of fluid or semi-solids involves inflating barrier 106 through port 108. During the inflation of barrier 106, the material of barrier 106 expands vertically and horizontally to its maximum height and width, thereby securing barrier 106 tightly within channel 104. Once inflated, the barrier is designed to withstand the force of the ensuing flood or divert the ensuing flood depending on the desired design. The force required will be calculated based on the expected source of flood in light of the factors previously enumerated herein. It is also contemplated that the inflation mechanism has the ability to increase or maintain internal pressure within the barrier.

The material used for barrier 106 and the inflation material of the flood control system may be designed for multiple use or one time use. For example, an air-based system may be inflated and deflated for multiple uses. In contrast a fluid such as polyurethane foam or other like fluid material can be delivered to the barrier through the port in a generally aqueous solution and expand and substantially solidify in a generally rigid form. In this instance, barrier 106 would be considered a one-time use barrier. One of ordinary skill in the art will readily recognize the benefit of using such a compressible transient fluid without departing from the principles disclosed herein.

Figure 5:
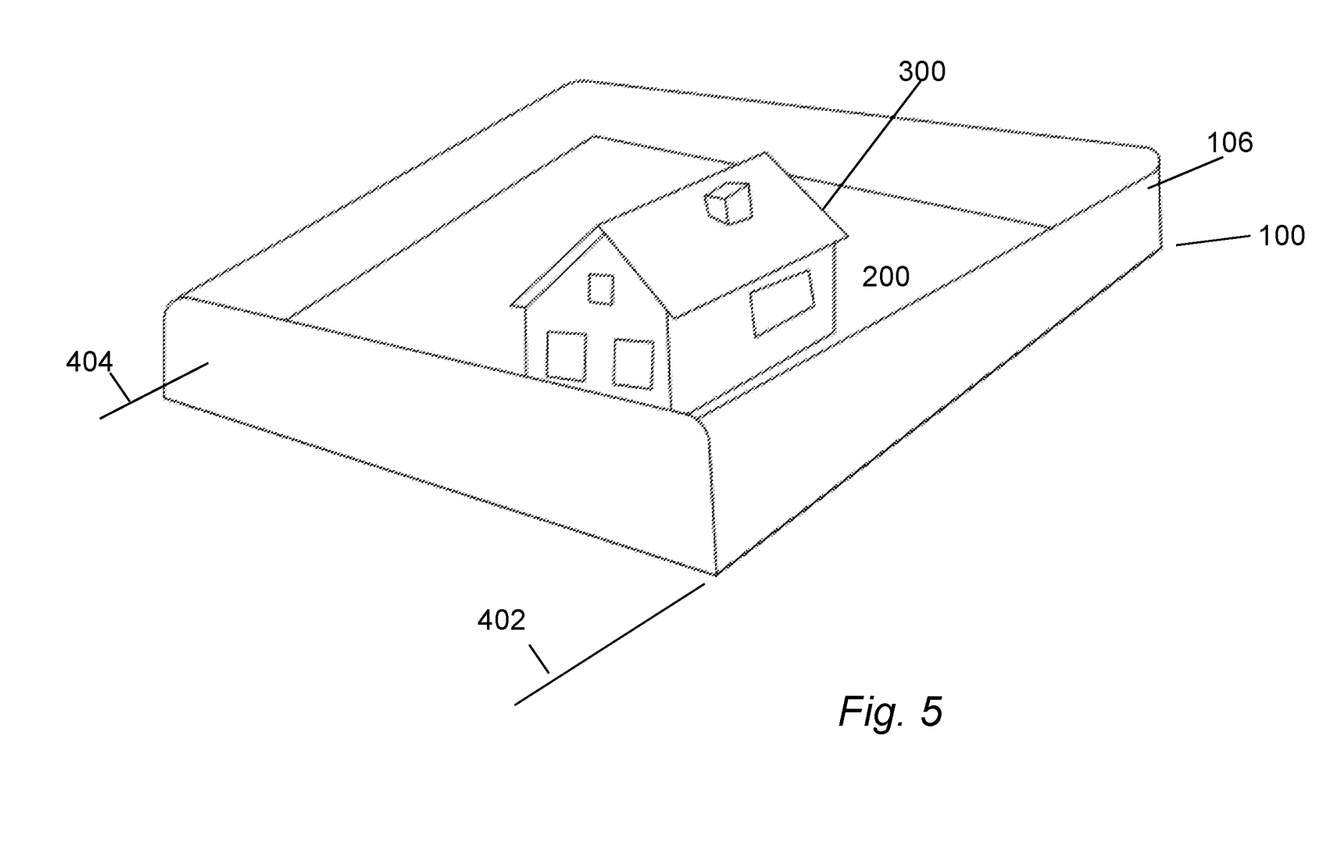
FIG. 5 illustrates an elevated side view of a flood control system in accordance with the principles disclosed herein.

FIG. 5 depicts a side view of the flood control system 100 in accordance with the preferred embodiment. As shown, barrier 106 is in its inflated state, thereby surrounding and protecting structure 300 from the encroachment of fluid or semi-solids that has risen to elevation 404. Elevation 404 is depicted a distance above grade 402, while barrier 106 in its inflated state is positioned above elevation 404. As a result, barrier 106 protects structure 300 from encroachment over barrier 106. Further, as shown in FIG. 5, barrier 106 obstructs the view of the surrounding environment from structure 300.

Figure 6:
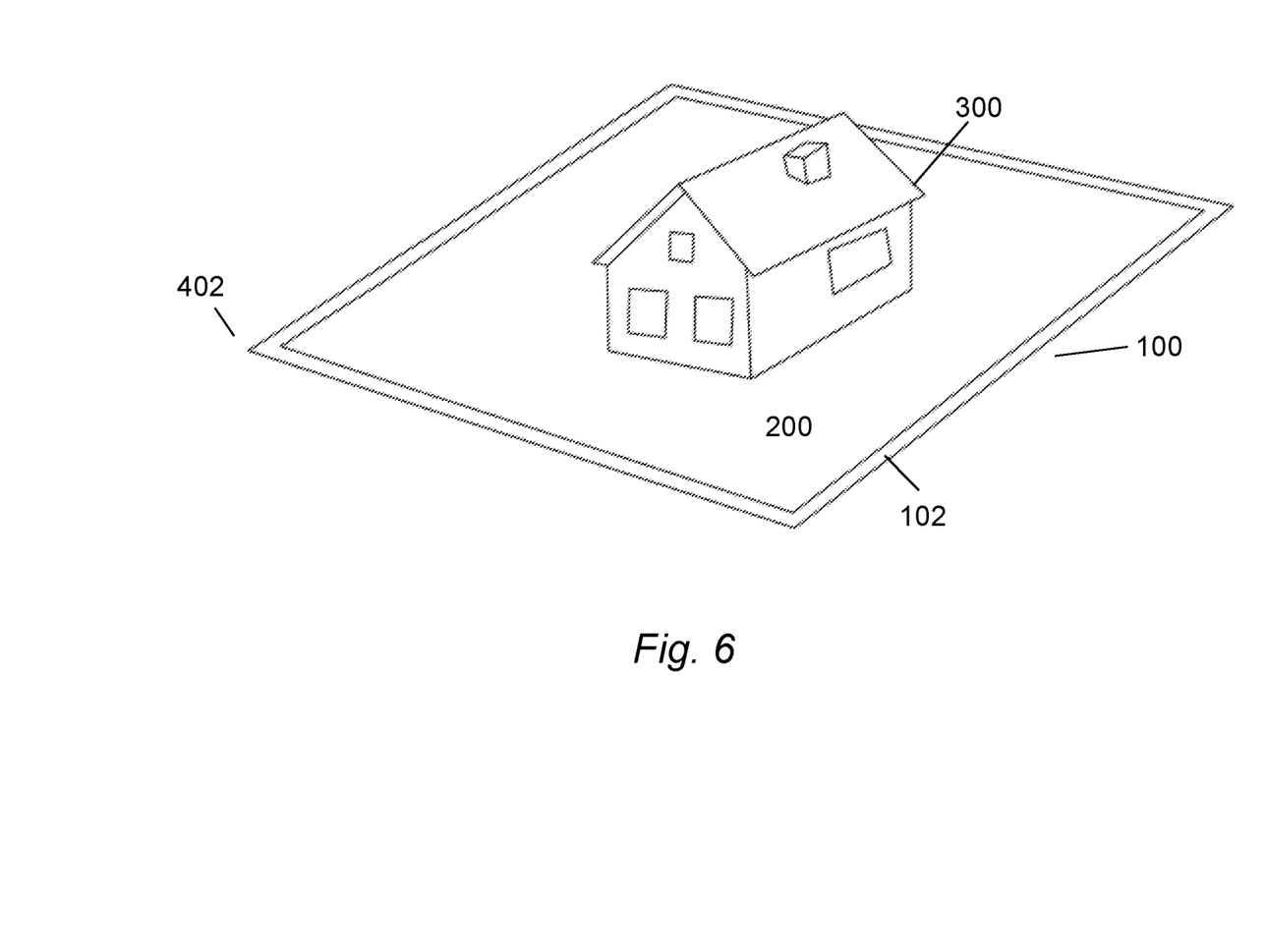
FIG. 6 illustrates an elevated side view of the flood control system shown in FIG. 5 in accordance with the principles disclosed herein.

In contrast, FIG. 6 depicts a side view of flood control system 100 not fully assembled, thereby preventing the obstruction of the view of the surrounding environment from structure 300. Base 102 is positioned below grade 402 and surrounds structure 300. As shown, an inflated barrier has not been installed into base 102 of flood control system 100. Typically a barrier would not be installed when the risk of encroachment of fluid or semi-solids is low or not present. As described above in detail with reference to FIGS. 4 and 5, the barrier can be quickly inserted and inflated as the risk of the encroachment of fluid or semi-solids increases.

The detailed description is not intended to be limiting or represent an exhaustive enumeration of the principles disclosed herein. It will be apparent to those of skill in the art that numerous changes may be made in such details without departing from the spirit of the principles disclosed herein.

What is claimed is:

1. A flood control system, comprising:
    a base comprising a channel, wherein the channel is an upside down T-channel shape;
    at least one foundation;
    an expandable barrier comprising a port;
    wherein the at least one foundation is coupled to the base;
    wherein the expandable barrier is removeably coupled to the channel; and
    wherein the expandable barrier is secured to the channel in an expanded state.

2. The flood control system of claim 1, wherein the at least one foundation is a metal helical pile.

3. The flood control system of claim 1, wherein the port is configured to attach to a source of pressurized fluid.

4. The flood control system of claim 3, wherein the source of pressurized fluid is air.

5. The flood control system of claim 1 wherein the expandable barrier is secured to the upside down T-channel shape utilizing an interference fit.

6. A flood control system, comprising:
    a base comprising a channel;
    at least one foundation;
    an expandable barrier comprising a port;
    wherein the expandable barrier is constructed from a ship recovery balloon fabric;
    wherein the at least one foundation is coupled to the base;
    wherein the expandable barrier is removeably coupled to the channel; and
    wherein the expandable barrier is secured to the channel in an expanded state.

7. The flood control system of claim 6, wherein the ship recovery balloon fabric comprises synthetic tire-cord layers.

8. The flood control system of claim 6, wherein the ship recovery balloon fabric comprises PVC coated fabric.

9. A flood control system, comprising:
    a base comprising a channel;

a plurality of foundations;
an expandable barrier comprising a port;
a source of pressurized fluid;
a structure;
wherein the base is positioned below a grade;
wherein the base is adjacent to at least one side of the structure;
wherein the plurality of foundations are coupled to the base;
wherein the expandable barrier is removeably coupled to the channel; and
wherein the expandable barrier is secured to the channel in an expanded state.

10. The flood control system of claim 9, wherein the plurality of foundations are metal helical piles.

11. The flood control system of claim 9, wherein the channel is an upside down T-channel shape.

12. The flood control system of claim 9, wherein the expandable barrier is constructed from a ship recovery balloon fabric.

13. The flood control system of claim 12, wherein the ship recovery balloon fabric comprises synthetic tire-cord layers.

14. The flood control system of claim 12, wherein the ship recovery balloon fabric comprises PVC coated fabric.

15. The flood control system of claim 9, wherein the source of pressurized fluid is air.

16. The flood control system of claim 9, wherein the expandable barrier is secured to the channel utilizing an interference fit in the expanded state.

17. A method of preventing the encroachment of fluid or semi-solids to a protected area, comprising the steps of:
creating a base comprising a channel wherein the base is positioned below a grade;
coupling a plurality of foundations to the base wherein the plurality of foundations extend downward;
inserting a removable expandable barrier into the channel wherein the expandable barrier comprising a port;
inflating the expandable barrier by attaching a source of pressurized fluid to the port; and
securing the expandable barrier to the channel utilizing an interference fit.

18. The method of claim 17, further comprising the step:
deflating the expandable barrier utilizing the port;
removing the expandable barrier from the channel; and
concealing the base and channel.

19. The method of claim 18, wherein the step of concealing the base and channel, further comprises the step:
covering the base and channel with a plate.

* * * * *